Sept. 16, 1969        G. G. BRAUN        3,466,752
HEATER STAND AND CAVITY INJECTOR
Filed Aug. 14, 1967
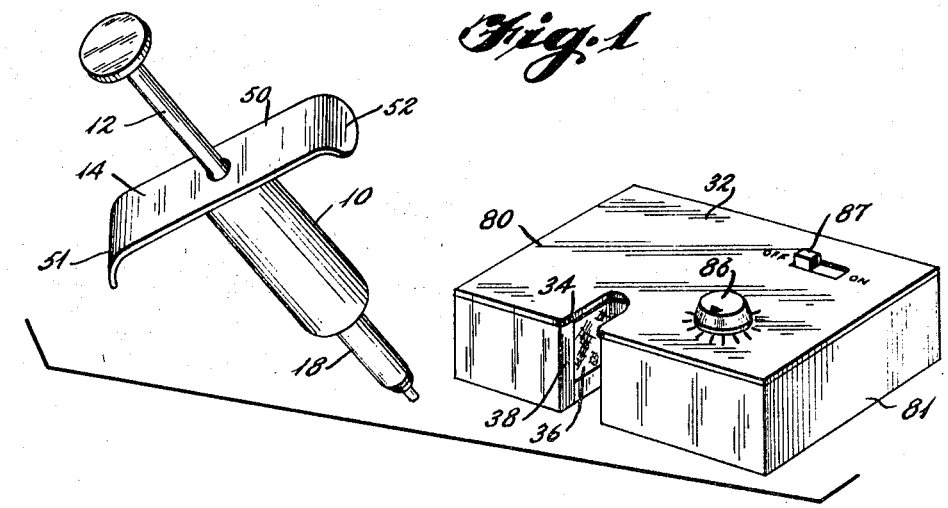
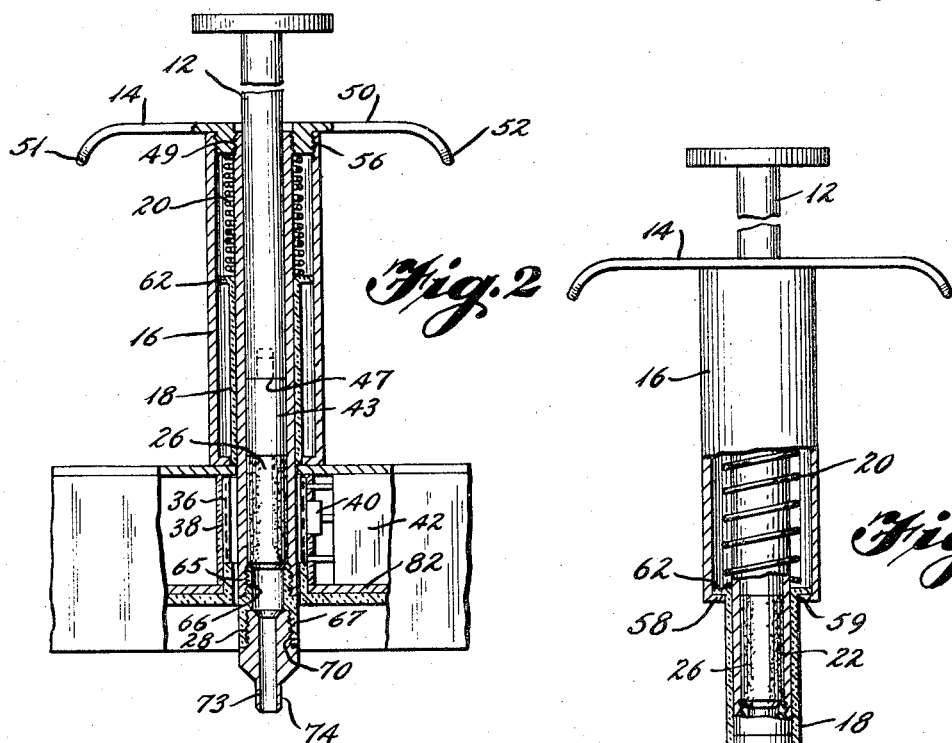
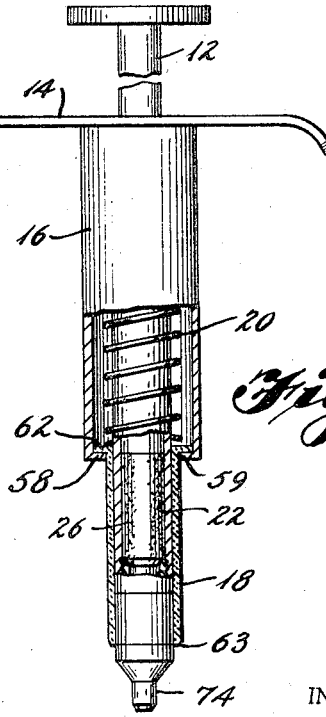
INVENTOR
GILLES G. BRAUN
BY
ATTORNEYS United States Patent Office 3,466,752
Patented Sept. 16, 1969

3,466,752
HEATER STAND AND CAVITY INJECTOR
Gilles G. Braun, 2 Clifton St.,
Barre, Vt. 05641
Filed Aug. 14, 1967, Ser. No. 660,404
Int. Cl. A61c 5/04
U.S. Cl. 32—60                           15 Claims

ABSTRACT OF THE DISCLOSURE

Dental cavity filling apparatus includes an electric heater stand and an injector for injecting heated thermoplastic into a tooth cavity. The heater stand holds the injector and warms the thermoplastic in the injector to a flowable condition and includes a thermistor heater control for maintaining the plastic at a suitable temperature.

The injector includes an elongated chamber for holding the thermoplastic and a spring biased movable insulating sleeve surrounding the chamber and which is held in retracted position during heating by a slot on the heater stand. The sliding insulator jacket automatically slides down over the plastic chamber when the injector is removed from the stand.

---

This invention relates to dentistry and more particularly to apparatus for injecting a heated thermoplastic into a tooth cavity and an associated stand for holding the injector and for heating and maintaining thermoplastic in the injector in a flowable condition. My co-pending application Ser. No. 647,368, for Dental Cavity Filling Device and Method, points out that a need exists for a device for injecting thermoplastics into dental cavities as fillers, and that such injector devices should be easy to heat and maintain at a proper temperature and should be safe to put into the mouth with minimum risk of burning the patient. Dental cavity injectors suitable for this purpose are disclosed in my co-pending application; the present application is directed to an alternative dental cavity filler useful for this purpose, and for the purpose of carrying out the cavity filling methods disclosed in the co-pending application.

Early devices for injecting thermoplastics into tooth cavities were normally made of metal and were heated by Bunsen burners or other externtal heat source to melt gutta-percha, a type of rubber used for making temporary fillings. Such injectors must be used with care to avoid burning the patient's mouth, and may not be suitable for use with modern thermoplastics which may require heating to higher temperatures. They might also be unsuited for filling cavities in awkward locations, such as the sides of molars where the cavity filler might contact skin inside the patient's mouth. Other thermoplastic injectors, such as that disclosed in Juffa et al., Patent 3,199,740, include a bulky insulation separated by a wide air gap from the chamber which holds the plastic and an internal heater for heating the thermoplastic. It is not known whether this type of insulated electrically heated device was intended for dental cavity filling use. In any event, it would be awkward to use for such purposes because of the bulkiness of the insulation and the heater and the interference of the electric wires. The dental cavity injectors disclosed in my co-pending application are less bulky and easier to manipulate, but are attached to electric heating wires. The device of the present application represents a still further improved dental cavity injector.

An object of the present invention is to provide a device for injecting thermoplastics into dental cavities which is light in weight, can be easily manipulated, and which can be used with minimum risk of burning the patient.

A further object is to provide such a thermoplastic injector which can be externally heated to soften the plastic but which is adequately insulated during use.

A further object is to provide a dental cavity injector in which the temperature can be precisely controlled, and which can be kept at a desired level so that the plastic may be injected into the tooth cavity.

A further object is to provide a dental cavity injector for thermoplastics which can be electrically heated and controlled, even though it has no connecting wires to interfere with its use.

Other objects and advantages of the invention will be apparent from the following description considered in conjunction with the accompanying drawing in which:

FIG. 1 is a perspective of a dental cavity injector and a heater stand for holding the injector and electrically heating thermoplastic to a flowing condition in accordance with the present invention;

FIG. 2, a cross-sectional view showing the dental cavity filler of FIG. 1 held in the heating stand with the slideable insulator jacket in the retracted position; and FIG. 3, a view, partially in section, showing the dental cavity filler of FIG. 1 outside the heating stand and with the slideable insulator jacket held in the extended position.

Briefly stated, these and other objects are accomplished by providing a dental cavity filler which includes a central metallic body member for holding thermoplastic which can be heated to a flowable condition and slideable insulator jacket which can be retracted to expose the central body member during heating by placing the dental cavity filler within a slot in an associated stand. The slot is wide enough to receive the central body member but not the sliding jacket. An electric heater is carried by the stand along the sides of the slot. The heater stand also has electric heat sensing means for maintaining the thermoplastic at the desired temperature for injection. The dental cavity filler also includes an outer insulated jacket which is spaced from the central body member to provide an annular slot for receiving the sliding jacket, and a spring mounted within the annular slot urging the sliding insulator jacket outwardly. A transverse hand grip is fixed to the top of the outer insulator jacket and a sliding plunger projects above the hand grip for engagement by the thumb and extends into the central chamber. Pushing the plunger downwardly causes the thermoplastic to flow outwardly through an insulated nozzle secured to the distal end of the injector.

Referring to the drawing, FIGS. 1–3, a dental cavity filler 10, according to the present invention, includes a plunger 12 projecting above a transverse hand grip 14 fixed to an outer insulator jacket 16. Within the outer insulator jacket 16 are an inner sliding insulator jacket 18, a coil spring 20 biasing sliding jacket 18 outwardly, and a central plastic chamber 22 mounted within sliding jacket 18. Plunger 12 slides within chamber 22 and ejects plastic 26. An annular insulator ring 28 is threaded to the lower end of chamber 22 and a nozzle 30 is threaded to the lower end of insulator ring 28. The heater stand 32 includes a slot 34 of a width greater than the diameter of chamber 22 but less than that of sliding insulator jacket 18. An electrical resistance heater 36 is fixed to the walls 38 of slot 34 as is a thermistor 40 connected to a heating circuit 42 contained within stand 32.

Plunger 12 includes a cylindrical rod 44 and a thumb knob 45 fixed at its upper end. Rod 44 fits within an opening 48 which passes through both hand grip 14 and a raised threaded cylindrical projection 49 on the hand grip's lower side. Cylindrical insulator plug 46 of the same diameter of rod 44 is threaded within the lower end 47 of plunger 12. The body 50 of hand grip 14 is flat and elongated and has rounded outer ends 51, 52 which are bent downwardly.

Outer insulator jacket 16 is threaded at its upper end 56 into hand grip projection 49 and is of cylindrical shape. It has an inwardly extending flange 58 defining a central opening 59 at its bottom. It may be made of any desired material having insulating properties.

Inner sliding insulator jacket 18 is also of cylindrical shape. Its lower end 63 fits within central opening 59 at the lower end of jacket 16. It has a flange 62 which extends outwardly at its upper end so as to slideably fit within outer insulator jacket 16. It may be made of any material having suitable insulating properties. Optionally, Teflon may be used. Although this material is difficult to work, it has excellent insulating properties and may be relatively thin. Coil spring 20 surrounds central plastic chamber 22 which is threaded into the cylindrical projection 49 and the lower surface of hand grip 14. This coil spring 20 acts against the lower surface of hand grip 14 and flange 62 to urge sliding insulator jacket 18 downwardly. When the jacket is fully extended, its flange 62 engages flange 58 on the outer jacket to retain the jacket in position.

Central chamber 22 has internal threads 65 on its lower end which engage external threads 66 on the upper end of annular insulator ring 28. Internal threads 67 on the lower end of annular insulator ring 28 engage external threads 70 on nozzle 30. Annular insulator ring 28 is made of any suitable insulator material. Optionally, it may be made of Teflon. It insulates nozzle 30 from the heat of central chamber 22.

Nozzle 30 has an axial bore 73 in a nipple 74 at its lower end. Nozzle 30 may be replaced by any of the alternative forms of nozzles disclosed in my co-pending application Ser. No. 647,368 if desired. These nozzles were intended for use in reaching awkwardly located tooth cavities, or for use in practicing the dental cavity filling method disclosed in that application. The nozzle 30 may also be replaced by the adapter tip disclosed in that application for carrying angularly disposed nozzles.

Heater stand 32 includes an upper plate 80 in which slot 34 is cut, sidewalls 81, and lower plate 82. Slot walls 38 connect upper plate 80 and lower plate 82 and carry electric resistance heater 36, as well as thermistor 40. Thermistor 40 is a device whose resistance varies with changes in temperature. Heating circuit 42 is substantially similar to the circuit disclosed in my co-pending application. It includes appropriate elements, which, in response to the change in resistance of thermistor 40, vary the electric current supplied to resistance heater 36. Heating support also includes an on-off switch 87 and a potentiometer having a knob 86 which can be turned to set the desired temperature level for heating the plastic.

In use, the dentist inserts a plug of the particular plastic with which it is desired to fill the tooth cavity. One appropriate plastic is nylon.

The dental cavity filler 10 is pushed downwardly into slot 34 in the heater stand 32. The force exerted by coil spring 20 is less than the weight of the dental cavity filler. Accordingly, the central chamber 22 slides down into the slot 34 and sliding insulator jacket 18, which is not wide enough to fit within the slot, moves to its raised position. Central chamber 22, carrying the plastic plug 26, is then located adjacent resistance heater 36. Switch 87 is turned on, and potentiometer knob 86 is set to a desired temperature to heat the particular plastic plug 26 to flowing condition. When the plastic reaches this temperature at which it can flow through central bore 73 of nozzle 30, heating stops as a result of the response of heating circuit 42 to resistance changes in thermistor 40. If the temperature drops below the flow point, heating resumes.

When the dentist, having previously cleaned and shaped the cavity, removes dental cavity filler from stand 32, coil spring 20 pushes sliding insulator jacket 18 down to overlie annular insulator ring 28. The cavity filler can then be inserted into the mouth with little danger of burning the patient.

The dentist holds the device between his index and his middle finger and presses downwardly on thumb knob 45 with the desired force to inject the plastic.

For purposes of clarity, this device has been shown in its simplest form in order to emphasize the inventive features of thet electrical stand and the insulation structure used with the cavity injector. It will be understood that many of the features of the dental cavity injector shown in my co-pending application, Ser. No. 647,368, may be used with the device.

For example, a foot-controlled air-actuated plunger as disclosed in that application may be used in place of thumb-actuated plunger 12. This substitution can be easily made by unscrewing hand grip 14, removing the thumb-actuated plunger 12, and substituting a hand grip having an air cylinder fixed to it and carrying an air-actuated plunger within it.

The dental cavity filler is of sufficiently inexpensive construction so the dentist, if desired, may own several of them and may heat the plastic in another dental cavity filler by placing it in the stand while he is using the first one. Different fillers may have different types of nozzles placed on them for successive use in treatment of the patient. This avoids the necessity of changing nozzles to fill particular types of cavities.

It will be apparent that there has been provided a dental cavity filler which is light in weight and can be easily manipulated, and which can be heated by an external heater with the sliding insulator jacket in the raised position, but which will be fully insulated when the device is inserted in the patient's mouth. It will be further apparent that the temperature of the thermoplastic can be kept at the desired level for injection into a tooth cavity.

It will be obvious to one skilled in the art that various changes may be made in the invention without departing from the spirit and scope thereof, and, therefore, the invention is not limited by that which is illustrated in the drawing and described in the specification, but only as indicated in the accompanying claims.

What is claimed is:

1. A device for injecting a thermoplastic material into a tooth cavity comprising
 a body member having
  chamber means for holding a thermoplastic material,
  means for injecting heated thermoplastic from the chamber means,
  insulating jacket means shaped to surround said chamber means, and
  means mounting said insulating jacket means for movement to and from a position surrounding a portion of the chamber means, weherby the thermoplastic material within the chamber may be heated with the insulating jacket removed, and the jacket can then be returned to surround the chamber prior to insertion in the patient's mouth.

2. The structure of claim 1 in which the chamber is elongated, and the jacket is mounted for longitudinal movement on the chamber means.

3. The structure of claim 2 including an outer casing spaced from the chamber means and including means mounting the insulating jacket for sliding movement into the space between the outer casing and the jacket.

4. The structure of claim 1 in which the injecting means includes a plunger mounted for longitudinal movement within the chamber means, and nozzle means for passage of thermoplastic from the chamber in response to plunger movement.

5. The structure of claim 1 including a nozzle means secured to the chamber means for injecting heated thermoplastic therefrom and means for insulating the nozzle means from the chamber means.

6. The structure of calim 5 in which the means insulating the nozzle includes a cylindrical member made of material having high heat insulating properties which is threaded into one end of a chamber member.

7. The structure of claim 6 in which the nozzle insulation means is an annular ring made of material having high heat insulating properties which is threaded into one end of the chamber means and has the nozzle means threaded onto the end opposite the chamber means.

8. The structure of claim 1 and a stand for holding the dental cavity filler including support means for holding the chamber means of the dental cavity filler, heater means for heating the thermoplastic to a flowable condition, and means mounting the heater means adjacent the position occupied by the chamber means when the dental cavity filler is held by the support means.

9. The structure of claim 8 in which the insulating jacket of the dental cavity filler surrounds and is mounted for longitudinal movement on the jacket means, and the support means on the stand includes a slot of a width greater than the chamber means but less than the insulating jacket means, whereby the dental cavity filler can be held within the stand with the slot holding the sliding jacket out of engagement with the chamber means during heating.

10. The structure of claim 9 in which the insulating jacket means is spring biased to the position in which it surrounds the chamber means and the spring force is less than the weight of the dental cavity filler and the slot is arranged to hold the chamber means in a generally vertical position, whereby the sliding insulator jacket will be held in the upper position when the dental cavity filler is inserted within the slot.

11. The structure of claim 8 including heat sensing means mounted on the stand adjacent the electric heater means.

12. The structure of claim 11 including means for controlling the temperature of the heating means in response to the temperature sensed by the heat sensing means.

13. A stand for holding and heating a dental cavity filler for injecting thermoplastic into a tooth cavity, said stand including an opening for receiving the dental cavity filler, heating means for heating thermoplastic in said dental cavity filler to a flowable condition, means mounting the heating means within the stand in a position to be adjacent a dental cavity filler inserted in said opening, and heat sensing means mounted adjacent the heating means for controlling the heating means in response to temperature changes of the dental cavity filler.

14. The structure of claim 13 in which the heating means is an electric resistance heater, and the heat sensing means include a thermistor whose resistance changes in response to the changes in temperature.

15. The structure of claim 14 in which the stand includes a generally horizontal member having a U-shaped slot therein and in which the heating means are mounted below the U-shaped slot in a pattern substantially corresponding to the shape of the edges of the U-shaped slot, and the heat sensing means are mounted below the edge of the slot, whereby a dental cavity filler inserted in the slot will be heated by the heating means and have its temperature sensed by the sensing means.

References Cited

UNITED STATES PATENTS

| 3,088,207 | 5/1963 | Borsuk | 32—60 |
| 3,281,576 | 10/1966 | Cooper et al. | 222—146 |
| 3,308,537 | 3/1967 | Novales | 32—60 |

ROBERT PESHOCK, Primary Examiner

U.S. Cl. X.R.

222—146